United States Patent
Bumann et al.

(10) Patent No.: US 12,060,749 B2
(45) Date of Patent: Aug. 13, 2024

(54) COMPOSITE GLASS PANE WITH A BORDER SEAL AND METHOD FOR PRODUCING SAME

(71) Applicant: SAINT-GOBAIN GLASS FRANCE, Courbevoie (FR)

(72) Inventors: Stefan Bumann, Monschau (DE); Dieter Kleyer, Wuerselen (DE); Manfred Gerads, Geilenkirchen (DE); Hans Falkenberg, Hoor (SE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 585 days.

(21) Appl. No.: 17/125,401

(22) Filed: Dec. 17, 2020

(65) Prior Publication Data

US 2021/0102423 A1  Apr. 8, 2021

Related U.S. Application Data

(63) Continuation of application No. 15/306,754, filed as application No. PCT/EP2015/058369 on Apr. 17, 2015, now abandoned.

(30) Foreign Application Priority Data

May 6, 2014  (EP) .................................... 14167126

(51) Int. Cl.
*E06B 3/673* (2006.01)
*B32B 17/10* (2006.01)
(Continued)

(52) U.S. Cl.
CPC .... *E06B 3/67343* (2013.01); *B32B 17/10036* (2013.01); *B32B 17/10155* (2013.01);
(Continued)

(58) Field of Classification Search
None
See application file for complete search history.

(56) References Cited

U.S. PATENT DOCUMENTS 1,818,159 A    8/1931  Randall
1,983,156 A *  12/1934 Watkins ............ B32B 17/10302
                                                222/537
(Continued)

FOREIGN PATENT DOCUMENTS

CN  101189127 A  5/2008
CN  102067032 A  5/2011
(Continued)

OTHER PUBLICATIONS

International Search Report for International Application No. PCT/EP2015/058369. Mail Date: Jun. 26, 2015. 6 pages. (German original+ English translation).
(Continued)

*Primary Examiner* — Jacob T Minskey
*Assistant Examiner* — Caroline Beha
(74) *Attorney, Agent, or Firm* — Pillsbury Winthrop Shaw Pitman LLP

(57) ABSTRACT

A composite glass pane having a first glass pane, a second glass pane, and an intermediate layer arranged between the first and second glass panes is described. The intermediate layer includes one cover layer based on a thermoplastic polymer, and a border seal. The first glass pane is arranged with an offset relative to the second glass pane, the intermediate layer is cut back along at least one edge of the composite glass pane by a border distance, and the border seal is arranged in a border gap delimited by the first glass pane, the second glass pane and the intermediate layer. The border seal contains a polymer fusible with a polymer of the cover layers.

10 Claims, 5 Drawing Sheets

Figure 1:
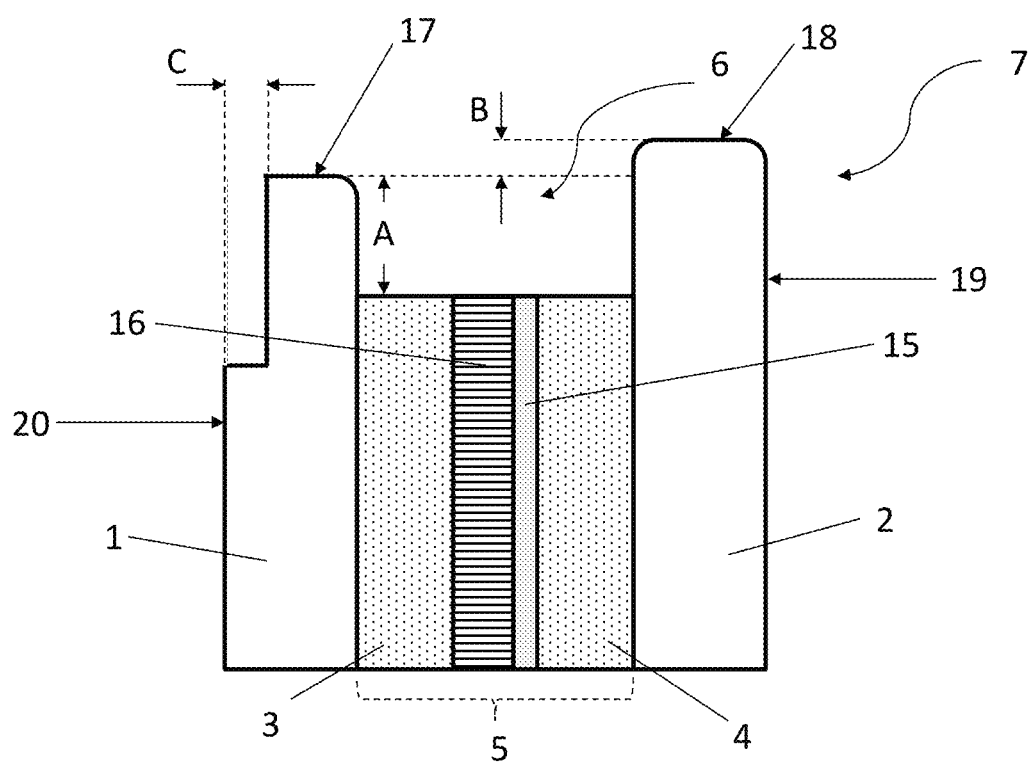

(51) Int. Cl.
  *B60J 10/34* (2016.01)
  *B60J 10/70* (2016.01)

(52) U.S. Cl.
  CPC .. *B32B 17/10302* (2013.01); *B32B 17/10761* (2013.01); *B32B 17/10807* (2013.01); *B60J 10/345* (2016.02); *B60J 10/70* (2016.02); *E06B 3/6736* (2013.01)

(56) References Cited

U.S. PATENT DOCUMENTS

| | | | |
|---|---|---|---|
| 1,992,997 | A | 3/1935 | Drake |
| 3,794,809 | A | 2/1974 | Beck et al. |
| 4,145,171 | A * | 3/1979 | Guzowski ........... E06B 3/67343 118/410 |
| 4,368,945 | A | 1/1983 | Fujimori et al. |
| 4,617,073 | A * | 10/1986 | Scott ................... E06B 3/67343 269/254 R |
| 5,908,675 | A | 6/1999 | Marquardt et al. |
| 5,980,666 | A * | 11/1999 | Roth ................... B32B 37/0038 264/261 |
| 2004/0244457 | A1* | 12/2004 | Hiramoto .............. B21C 23/085 72/269 |
| 2012/0055094 | A1 | 3/2012 | Iacovoni |
| 2016/0052012 | A1 | 2/2016 | Mohr |

FOREIGN PATENT DOCUMENTS

| | | |
|---|---|---|
| DE | 2344616 A1 | 3/1975 |
| DE | 19503510 A1 | 8/1996 |
| DE | 19622566 | 11/1997 |
| DE | 69606891 T2 | 10/2000 |
| DE | 102009058136 A1 | 6/2011 |
| DE | 102013003688 A1 | 4/2014 |
| EP | 0303586 A2 | 2/1989 |
| EP | 0303587 A2 | 2/1989 |
| EP | 0758582 A2 | 2/1997 |
| EP | 0724955 B1 | 3/2000 |
| GB | 325048 A | 2/1930 |
| JP | H09-165237 A | 6/1997 |

OTHER PUBLICATIONS

International Preliminary Report Patentability for International Application No. PCT/EP2015/058369 issued on Nov. 8, 2016. 21 pages. (Eng+Ger translation).

Written Opinion for International Application No. PCT/EP2015/058369 mailed on Jun. 26, 2015. 19 pages. (Eng+Ger trans).

Peschka M et al: 11 Sensorgestuetzte Versiegelung Von KFZ-Isolierglas 11, Adhasion Kleben Und Dichten, GWV Fachverlag GmbH, Wiesbaden, DE, vol. 37, No. 6, Jun. 1, 1993 (Jun. 1, 1993), pp. 24,26-27, XP000369332, ISSN: 0943-1454 Sensorgestützte Versiegelung; p. 26-p. 27.

* cited by examiner

COMPOSITE GLASS PANE WITH A BORDER SEAL AND METHOD FOR PRODUCING SAME

This application is a continuation of U.S. application Ser. No. 15/306,754, filed on Oct. 25, 2016, which is the U.S. National Stage of PCT/EP2015/058369, filed on Apr. 17, 2015, which in turn claims priority to European Patent Application No. 14167126.3, filed on May 6, 2014. The contents of these applications are incorporated herein by reference in their entireties.

The invention relates to a composite glass pane provided with a border seal, comprising at least two glass panes and an intermediate layer arranged therebetween, containing at least one cover layer based on a thermoplastic polymer. Also, the invention relates to a method for producing such a composite glass pane and its use, in particular as a freestanding pane.

Composite glass panes that contain intermediate layers comprising corrosion-sensitive functional layers can be produced in various ways. Generally, the corrosion-sensitive layer is arranged between cover layers made of polymer and protected by them against corrosion. In the edge region of the composite glass pane, corrosion of the functional layer can occur when the layer extends to the edges of the composite glass pane and the edges are exposed.

In the production of composite glass panes with corrosion-sensitive functional layers, such as, for example, metal-containing layers, carrier films can be used, on which the metal-containing layer is already present. These carrier films can be bonded to the outer glass panes via thermoplastic polyvinyl butyral films. DE 23 44 616 A1 describes an electrically heatable pane, in which the metal-containing layer is removed in the edge region in order to protect it against corrosion. In this edge region, the polyvinyl butyral film bonds directly to the surface of the carrier film made of polyethylene terephthalate and thus provides for the necessary sealing. It is known to use a carrier film that is smaller than the glass panes and to embed the carrier film between two thermoplastic films that have the same size as the glass panes and to position it together with the two glass panes such that the coated carrier film ends at a distance of at least 3 mm before the edge of the glass pane (U.S. Pat. No. 3,794,809 A). The polymer of the thermoplastic films enveloping the carrier film is then cross-linked by means of a heat and pressure treatment to ensure the desired border seal. The two methods described above require that coated carrier films be used with which at least the coated side is freely accessible, and which, consequently, must be combined with at least one additional film, namely, a thermoplastic film made, for example, of polyvinyl butyral. Carrier films with an exposed layer have the crucial disadvantage that the sensitive surface layer is exposed without protection during the necessary manipulations of the coated carrier film such that the risk of damage and/or contamination of the surface layer exists. Such defects are visible in the finished composite glass pane.

Another possibility for protecting the metal-containing layer against corrosion is the application of a sealant in the border region. If need be, the metal-containing layer can, in addition, be removed in the border region. The use of sealants in the border region is, for example, possible without problems in the case of stationary vehicle window panes, such as, for instance, windshields. In the case of the production of freestanding side panes, the fact must be taken into account that their edges are exposed when the window is open and, thus, the border seal is visible and is exposed to mechanical stresses.

The patent DE 10 2009 058 136.7 discloses a sealed substrate layer composite pane that includes at least two transparent glass panes, a functional film-composite element arranged therebetween, and a border seal. The functional film-composite element preferably consists of a functional film and two laminating film layers, wherein the functional film is completely embedded between the laminating film layers and the edge surface of the composite element is formed by the laminating film layers. The functional film-composite element can be smaller than the glass panes because of the area expansion, and the border seal can be applied as an inner sealant in the resultant border gap and end flush with the glass panes, or it can be applied, as an external sealant, surrounding the two panes with the gap. The latter embodiment is unsuitable for a retractable and extendable side window. Proposed as an internal sealant is an adhesive tape or a sealing cord made of a soft elastic material such as butyl or silicone. With the use of an adhesive tape, it is difficult to react to tolerances and unevenness in the glass. In addition, problems can occur with the sealing at the corners. The use of soft, sticky sealing materials in a retractable and extendable side window pane has the disadvantage that when the pane is retracted, the sticky edge of the pane is exposed.

The German translation DE 696 06 891 T2 of the European patent EP 0 724 955 B1 discloses a method for producing a composite glass pane provided with a border bond. The composite glass pane comprises at least two glass panes with a laminate positioned therebetween, whose area is smaller than that of the two glass panes, as a result of which a border gap develops in the pre-laminate, into which a thermoplastic polymer is extruded. The method described has the disadvantage that it is feasible only for ideal composite glass panes, whose individual glass panes are arranged perfectly congruently without an offset relative to one another. However, often the glass panes in the pre-laminate are not perfectly congruent and deviations in the thicknesses of the glass panes can occur. Since the method described is based on producing contact between an extrusion die and the pre-laminate, deviations from the ideal situation result in the fact that the border gap is not hit well. This can, on the one hand, result in defective sealing and, on the other, high pressures can build up in the system since the melt cannot leave the extrusion die. Another disadvantage of the method disclosed, in which contact is produced between the extrusion die and the pane edges, is the severe wear of the tools on the polished pane edges.

The object of the present invention is to provide another composite glass pane with a border seal and an improved method for its production that can be used industrially and is compatible with an offset arrangement of the glass panes in the pre-laminate and results in a reliably and durably sealed composite glass pane that is suitable for use as a freestanding pane.

The object of the present invention is accomplished according to the invention by a composite glass pane with a border seal according to independent claim 1 and a method for producing such a composite glass pane and its use. Preferred embodiments of the invention are apparent from the subclaims.

The composite glass pane according to the invention comprises a first glass pane, a second glass pane, an intermediate layer arranged therebetween, which includes at least one cover layer based on at least one thermoplastic polymer.

In addition, the composite glass pane includes a border seal along at least one edge of the composite glass pane. The border seal can be arranged along one edge, along two edges, or along all edges of the pane. The first glass pane is arranged with an offset B relative to the second glass pane. The intermediate layer arranged between the glass panes is cut back along edges of the composite glass pane by a border distance A, in other words, the area of the intermediate layer is smaller than the area of the two glass panes. Since the intermediate layer is cut back along the edges of the composite glass pane, a border gap is created, which is delimited by the first glass pane, the second glass pane, and the intermediate layer. The border seal is arranged in the border gap and completely fills the border gap between the first glass pane and the second glass pane.

The invention thus makes available a composite glass pane, whose individual glass panes have an offset B relative to one another, which are sealed visually appealingly and have no sticky edges, such as, for example, after sealing with a butyl sealant. The offset B can be the result of production factors or can be deliberately desired. The offset B can, for example, be desired when, after installation, one of the individual glass panes of the composite pane is supposed to protrude into a frame opening along one or a plurality of edges in order to produce a visually appealing and smooth transition between the pane and the frame.

The individual glass panes have a thickness between 1 mm and 4 mm. They can have the same thickness, for example, both be 2.1 mm thick, or one pane can be thinner, for example, 1.6 mm. For reasons of weight savings, both panes can also be thinner and/or have different thicknesses, for example, be 1.6 mm and 1.1 mm thick.

The area of the glass pane is the area of the pane on which the functional intermediate layer is arranged. The term "edges" of the pre-laminate or of the composite glass pane denotes the border of the pre-laminate or of the composite glass pane. The term "pane edges" denotes the borders of the individual glass panes that form the pre-laminate.

Depending on the desired use of the pane, a border gap can be arranged along one edge of the pre-laminate, along two edges, or along all edges of the pre-laminate, which gap can then be filled with a border seal.

The thermoplastic polymers that are fusible with the thermoplastic polymer of the outer cover layer are preferably polymers of the same basic composition as the polymer of the cover layers with or without additives (e.g., one or a plurality of adhesion promoters). Most simply, the polymer of the border seal is identical to the polymer of the cover layers.

In a preferred embodiment of the composite glass pane according to the invention, the offset B is 0.01 mm to 3 mm, preferably 0.05 mm to 2 mm, and particularly preferably 0.1 mm to 1 mm. In these ranges, particularly good sealing results are obtained.

In another preferred embodiment, the border distance A is 1 mm to 10 mm. With such a border distance A, the best results can be obtained with a border seal. If the border distance A is, for example, too small, the seal can easily fail in the event of mechanical loading.

In another advantageous embodiment, the composite glass pane has, along the edges, a thickness variation C, which is at most 0.5 mm, preferably is between 0.02 mm and 0.1 mm.

In another advantageous embodiment, the cover layer contains a thermoplastic polymer, preferably a thermoplastic polyvinyl butyral, and the border seal contains a melt of the same thermoplastic polymer. Suitable as a thermoplastic polymer for the cover layers of the intermediate layer and for injection into the border gap are, for example, thermoplastic polyurethanes, as they are known in the production of composite glass panes for connecting plates or films made of polycarbonate to glass panes and are on the market. However, for economic reasons, polyvinyl butyral is preferred, as it is used on a large scale for the thermoplastic intermediate layer in composite glass production. It has been demonstrated that this customary polyvinyl butyral can be melted and injected into the border gap. Care must be taken only that, in the melting and injection, a temperature of 230° C. is not exceeded and the entry of air or oxygen into the molten polyvinyl butyral is prevented as much as possible, for, otherwise, a discoloration of the polymer can occur.

To improve the adhesive properties of the thermoplastic polymer used, an adhesion promoter can be added. The composition of the polyvinyl butyral customarily used for composite glass production is adjusted such that the adhesion to the glass does not exceed a certain maximum value. With excessive adhesion, the safety properties of the composite glass pane are degraded. Since this aspect plays no role in the border region of the composite glass pane, and since, on the other hand, it may be of interest for the purpose of a particularly effective sealing in the region of the border gap that polyvinyl butyral adheres particularly well to glass, it is possible in an expedient improvement of the invention to provide the thermoplastic polymer of the border seal with an adhesion-enhancing additive, for example, with a silane.

The intermediate layer preferably contains, between two cover layers made of a thermoplastic polymer, a carrier film and a corrosion-sensitive functional layer arranged on the carrier film. The method according to the invention requires no special measures for the protection of the corrosion-sensitive functional layer during production of the composite glass pane, since this functional layer is completely protected by the thermoplastic cover layer. In the laminating process, only a single film, namely, the prefabricated intermediate layer, is required. The intermediate layers can be purchased, and can have, for example, an IR reflective function or, in addition, even a soundproofing function. If the panes are used as motor vehicle window panes, the carrier film with the functional layer is preferably arranged between the glass panes such that, after installation of the finished composite glass pane, the functional layer faces the vehicle exterior. One of the cover layers can even be implemented as a sound-absorbing acoustic polyvinyl butyral film, which is then installed on the glass pane facing the vehicle interior.

In another advantageous embodiment, the border seal has an angle of inclination from a pane edge of the first glass pane to a pane edge of the second glass pane. With this, a particularly advantageous visual result is obtained.

The invention further includes a method for producing a composite glass pane according to the invention. The method according to the invention requires the use of an intermediate layer including a cover layer made of a thermoplastic polymer and comprises the following process steps:

a) producing a pre-laminate,
   which includes a first and a second glass pane and an intermediate layer arranged therebetween,
   which has, along at least one of its edges, a border gap, and
   in which the two glass panes have an offset B, b) introducing a border seal into the border gap, by
   injecting a melt of a thermoplastic polymer fusible with the cover layer with an extrusion die into the border gap, with an opening of the extrusion die positioned between a first roller and a second roller directly in front of the border gap, in that the first roller rests against a pane edge of the first glass pane and the second roller rests against a pane edge of the second glass pane, with the first roller and the second roller being displaceable parallel to the surface of the glass panes and thus compensating for the offset B, and the pre-laminate rests with a pane surface on a third roller, which is displaceable perpendicular to the plane of the glass panes, and c) producing a final bond between the glass panes and the intermediate layer to form a composite glass pane under the action of heat and pressure, and, at the same time, fusing the polymer injected into the border gap with the polymer of the cover layer.

The production of the pre-laminate is done from two individual glass panes and one intermediate layer. The intermediate layer is cut to size and placed between a first glass pane and a second glass pane. A pre-laminate is produced from this layer package of glass panes and intermediate layer by removal of the air between the layers and production of a preliminary bond. Appropriate methods such as the vacuum bag method, the vacuum ring method, or the use of rollers, which remove the air between the panes, are known to the person skilled in the art. In the production of the pre-laminate, the glass panes are, in the ideal case, arranged perfectly congruently. In the actual process, small deviations repeatedly occur such that the individual glass panes are arranged with a slight offset of at most 3 mm relative to one another. For certain products, an offset is deliberately selected. The pre-laminate has a border gap, which can be produced by cutting the intermediate layer to size before placement between the two glass panes such that its area on the border is, in each case, somewhat smaller than the area of the glass panes. Alternatively, the intermediate layer can be cut to size such that it is congruent with the glass panes and, after the production of a preliminary bond in the pre-laminate, the thermoplastic polymer is removed in the border region with, for example, a suitable brush such that a border gap with the desired size is obtained. The pre-laminate can be produced such that it has a border gap along precisely one edge, along precisely two edges, or along all edges.

When an offset arrangement of the glass panes relative to one another is present in the pre-laminate, it is difficult to fill the border gap using an extrusion that rests against or on a pane edge of the glass, since the pane edges of the two individual glass panes of the pre-laminate are not at the same height. This problem is surprisingly solved by movable rollers that are displaceable parallel to the plane of the glass panes and can thus compensate for the offset of the glass panes. The individual rollers are in contact with the pane edges of the individual glass panes, and the extrusion die is arranged between the rollers displaceable in parallel. In this manner, the extrusion die is positioned directly in front of the border gap despite the offset, and the melt of the thermoplastic polymer is selectively injected into the border gap.

For production reasons, there can also be thickness variations in the pre-laminate that can be attributed to deviations in the glass surface or which are caused by changes in the thickness of the intermediate layer. This problem is solved according to the invention with at least one roller that is displaceable perpendicular to the plane of the glass panes. The pre-laminate rests on or against the third roller such that the border gap points toward the opening of the extrusion die. Since the third roller is movable perpendicular to the plane of the glass panes, thickness variations of the pre-laminate can be compensated by it. Moreover, thanks to this roller, the device can be adapted in a simple manner for the production of composite glass panes of different thicknesses. The sealing method can be automated without problems with the use of known methods.

The fusing of the injected thermoplastic polymer with the polymer of the cover layers under the action of heat and pressure can be done during the autoclave process known to the person skilled in the art to which the pre-laminate is subjected for the final adhesive bonding of the individual glass panes to the intermediate layer lying therebetween. The pressures used in the autoclave process are between 9 bar and 14 bar and the temperature is between 120° C. and 160° C., preferably at approx. 140° C.

After the production of the finally bonded composite glass pane, protruding polymer can be removed from the border seal such that a smooth, visually appealing edge is obtained that compensates for the offset of the glass panes.

Preferably, the opening of the extrusion die has a rectangular or oval geometry, with the height preferably between 0.5 mm and 0.7 mm, particularly preferably 0.6 mm, and the die has a width between 1.5 mm and 3 mm. This geometry is preferable to a circular geometry since, with a circular geometry, a large opening is required for optimum filling of the border gap. For this, the pressures in the system would have to be increased such that the process is no longer feasible. An excessively wide opening results in problems at curves and corners of the pane, since, then, on the sides of the opening, the melt of the thermoplastic polymer is not injected into the border gap, but instead leaves the die near/in front of the border gap.

In a preferred embodiment of the method, the pre-laminate with the border gap directed toward the extrusion die is guided past the extrusion die. For this, the pre-laminate is fixed, for example, by a vacuum suction gripper that is precisely adapted to the contours of the pre-laminate. This suction gripper can be remote-controlled by a robot and brings the pre-laminate first into the starting position such that the pre-laminate rests with the pane surface on the third roller and the edge of the first glass pane rests against the first roller and the edge of the second glass pane rests against the second roller. In order to be able to compensate for deviations in two directions, in other words, protruding and receding edges or unevenness, the gripper drives the pre-laminate into the starting position such that the rollers are, in each case, moved from their free position by a specific amount in their corresponding direction of movement. The amount, by which the rollers are moved, depends on the deviations to be compensated. In the starting position, the rollers are preferably deflected by at least half of the amount of the maximum available compensation path.

In another embodiment, the extrusion die can be guided past the border gap of the pre-laminate by a remote-controlled robot. This variant is easier to program than when the pre-laminate is guided past the extrusion die.

In a preferred embodiment of the method according to the invention, the pre-laminate is heated during injection of the melt of the thermoplastic polymer, preferably to 35° C. to 100° C. and particularly preferably to 40° C. to 80° C. The flow properties of the thermoplastic polymer are improved by heating without the adhesion to the glass becoming too strong during the injection.

It is advantageous if the flow of the melt out of the extrusion die can be regulated, since at a constant speed of movement of the extrusion die or of the pre-laminate on straight stretches more polymer can be accommodated than at corners or curves. Regulation of the flow out of the extrusion die can be done, for example, using a bypass that is mounted in front of or on the extrusion die and which can be in different positions. When the bypass is closed, the entire melt is directed to the opening of the extrusion die, which corresponds to the maximum flow. When the bypass is partially enclosed, a portion of the melt is directed to the opening of the extrusion die and a portion into a separate container, which corresponds to a reduced flow. When the bypass is in its open position, the entire melt is directed into a separate container. This regulation enables a clean filling of the border gap even in curved regions with reduced speed.

The invention further includes the use of a composite glass pane produced with the method according to the invention as a freestanding pane, preferably as a freestanding motor vehicle side window pane. For these panes, visually appealing and mechanically robust edges that are reliably sealed are required. The composite glass panes produced according to the invention are also suitable for use in buildings, in particular in access areas, window areas, or façade areas, as built-in components in furniture and devices and generally in means of transportation for travel on land, in the air, or on the water, in particular in trains, ships, and motor vehicles, for example, as a windshield, rear window, and/or side panes with exposed edges.

Figure 2:
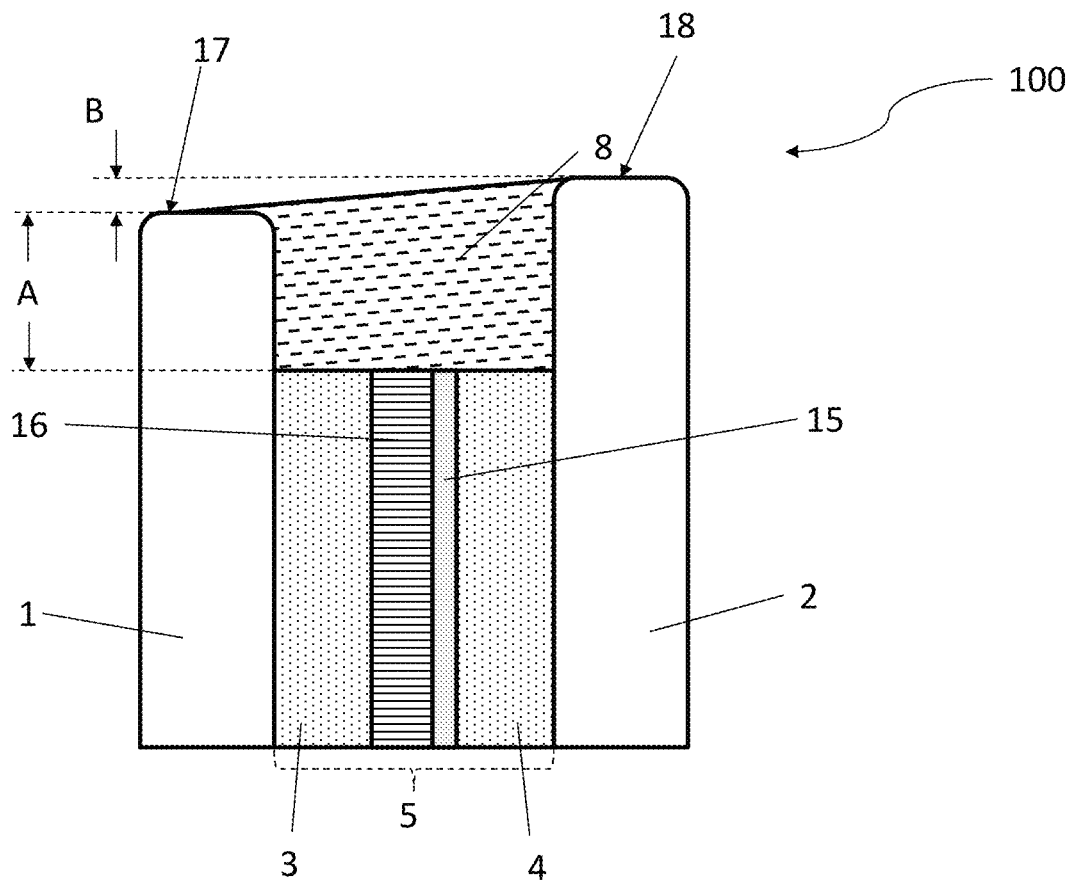
Figure 3:
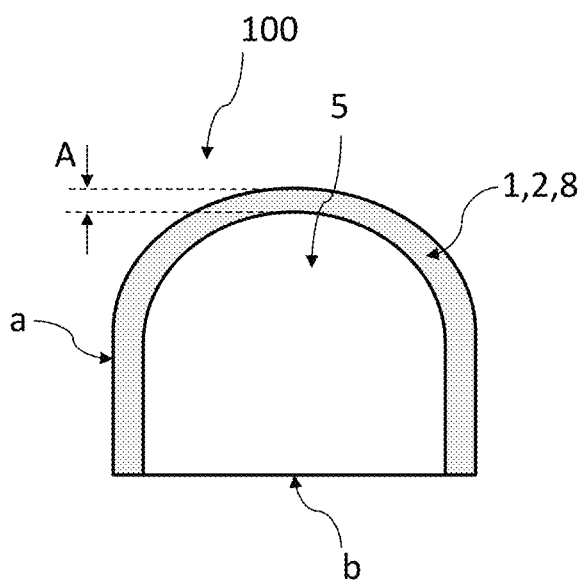
Figure 4:
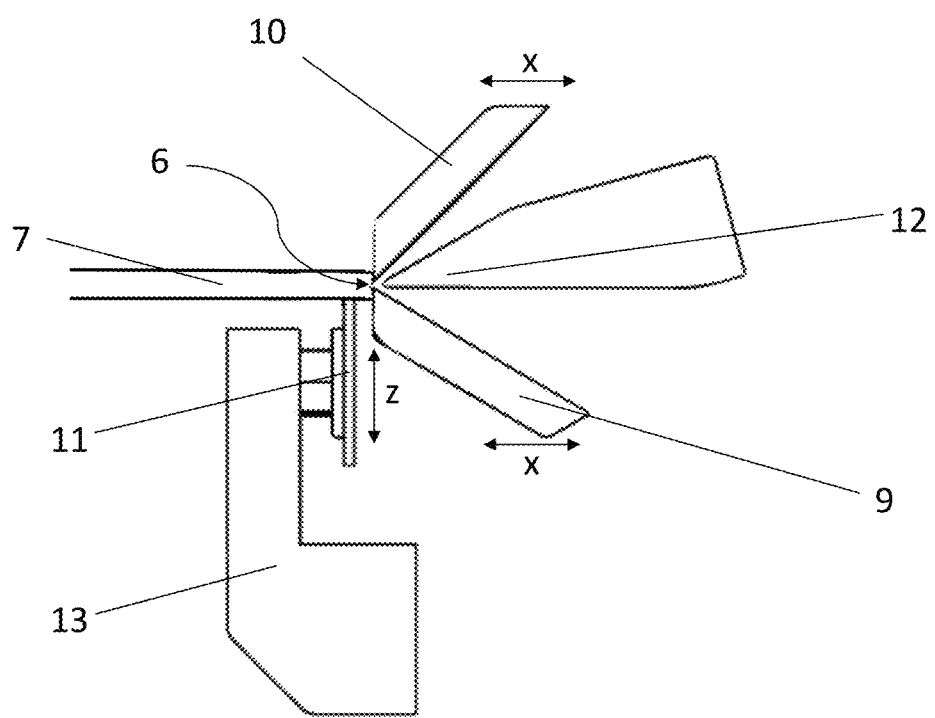
Figure 4:
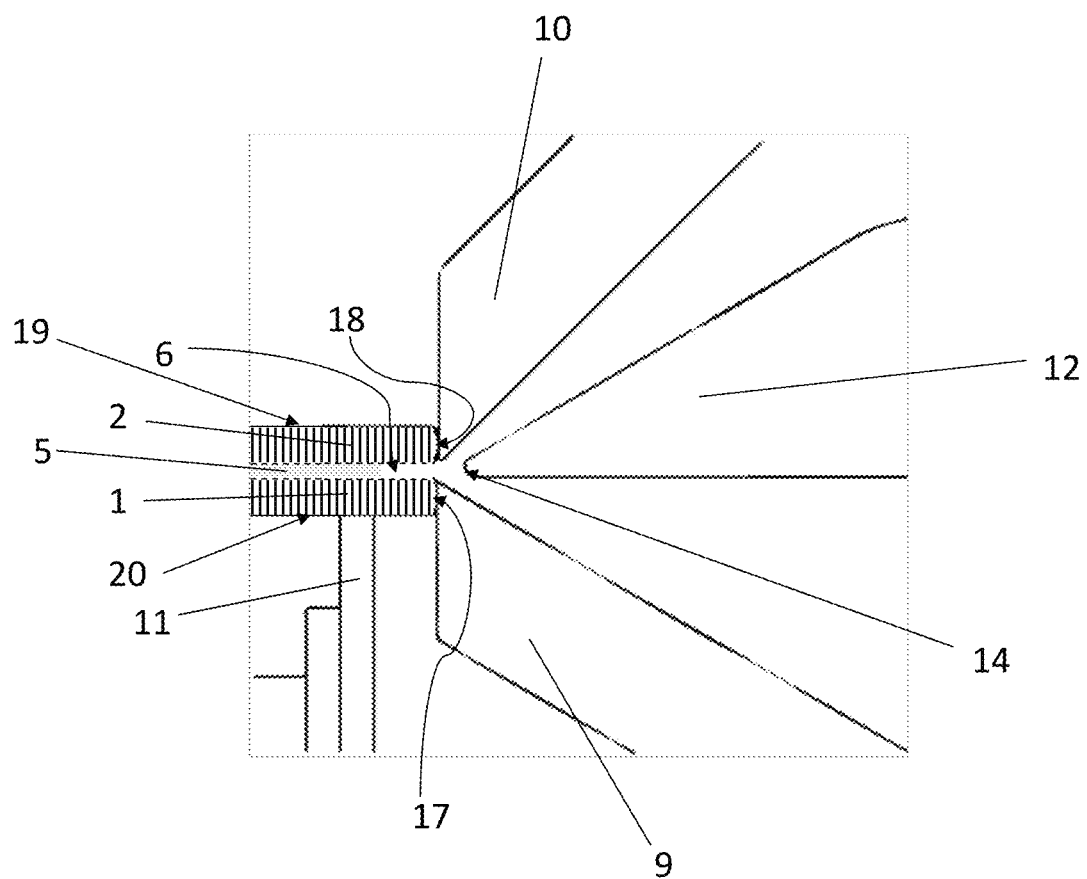
Figure 5:
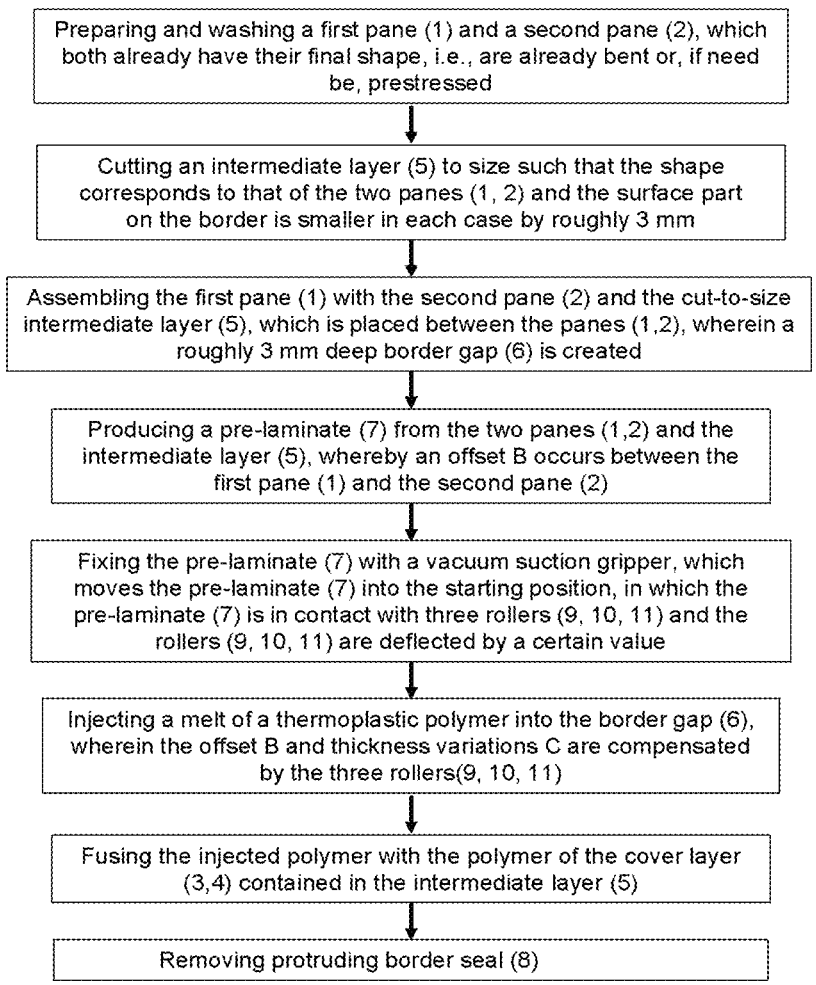

In the following, the invention is explained in detail with reference to drawings. The drawings are purely schematic and not true to scale. They in no way restrict the invention. They Depict:

FIG. 1 a cross-section of a pre-laminate that can be processed with the method according to the invention, FIG. 2 a cross-section of a composite glass pane according to the invention, FIG. 3 a plan view of a surface of a composite glass pane according to the invention, FIGS. 4a and b schematic representations of an apparatus for use in the method according to the invention, and FIG. 5 a flowchart of a possible embodiment of the method according to the invention.

FIG. 1 depicts a cross-section in the border region of a pre-laminate (7), which is composed of two glass panes (1 and 2), 1 mm to 4 mm thick, in each case, and an intermediate layer (5) arranged therebetween. The intermediate layer (5) comprises a carrier film (16), for example, made of polyethylene terephthalate (PET) of 0.02 mm to 0.1 mm thickness, which is provided on one side with an IR reflecting metal-containing layer (15), and cover layers (3,4), which are made, for example, of polyvinyl butyral (PVB) and have, in each case, a thickness of roughly 0.4 mm. The functional layer (15) can, in particular, consist of a multilayer, in which the actual functional layer is a silver layer that is embedded between other layers made of metal and/or metal compounds. Instead of a single silver layer, the metal-containing layer (15) can also have two or three silver layers that are separated from one another by layers made of dielectric metal compounds. The intermediate layer (5) can also be structured such that a coated PET film is bonded on the layer side via an adhesive layer to another, however uncoated PET film, wherein this laminating film is provided on both sides with a cover layer (3,4) made of thermoplastic polymer such as polyvinyl butyral. Intermediate layers (5) suitable for this purpose are described, for example, in U.S. Pat. No. 4,368,945, EP 0 303 586, and EP 0 303 587. Intermediate layers (5) of this type are produced by the manufacturers as foil tapes in an endless process and delivered in roll form. Since the intermediate layer (5) is cut back on the edges that are to be sealed, the pre-laminate (7) has a border gap (6) with a border distance A, which results from the difference in the area expanse of the intermediate layer (5) and that of the glass panes (1, 2) in the border region. The border distance A is 1 mm to 6 mm. In the production of the pre-laminate (7), an offset B of the two glass panes (1, 2) relative to one another can result from production technology factors. In this case, the border distance A is measured starting from the glass pane (1) set back in the border region and refers to the distance between the pane edge (17) of the set-back glass pane (1) and the start of the intermediate layer (5). The offset B results in difficulties during the filling of the border gap (6) with an extrusion die (12) resting against the pre-laminate (7), since the pane edges (17,18) of the individual glass panes (1,2) are not arranged at the same height. In addition, thickness variations C of the pre-laminate (7) can occur, which are caused in the example depicted by deviations of the thickness of a glass pane (1), which can result in problems during the use of an extrusion die resting against the pre-laminate (7). The pane surfaces (19,20) are the outer surfaces of the glass panes (1, 2) arranged parallel to one another, on which a glass gripper can fix the pre-laminate (7) or with which the pre-laminate (7) can rest on a bearing roller.

FIG. 2 depicts a cross-section in the border region of a composite glass pane (100) produced in accordance with the method according to the invention, which comprises a first glass pane (1), a second glass pane (2), and an intermediate layer (5) containing cover layers (3,4) made of polyvinyl butyral, a carrier film (16) made of polyethylene terephthalate, an IR reflecting metal-containing layer (15), and a border seal (8) made, for example, of polyvinyl butyral. The border seal (8) seals the composite glass pane (100) against the penetration of dirt and moisture and thus protects the metal-containing layer (15) against corrosion. The border seal (8) ends with the pane edges (17,18) of the glass panes (1,2) and extends over the entire border distance A and also partially over the region of the offset B, as is depicted in FIG. 2. The border seal has, in the example depicted, an angle of inclination from the pane edge (17) of the first glass pane (1) to the pane edge (18) of the second glass pane (2). After production of the final composite glass pane (100) under the action of heat and pressure, the polymer of the border seal (8) fuses with the polymer of the cover layers (3,4) such that virtually no visible separation line remains. A visually flawless edge of the border seal (8) can, for example, be obtained by grinding, whereby protruding border seal (8) is removed.

FIG. 3 depicts a plan view of a surface of a composite glass pane (100) according to the invention. In the interest of clarity, an offset B is not depicted. Corresponding to the shape of the glass panes (1,2), the intermediate layer (5) is cut to size such that it is smaller on the edges (a) on which the sealing is to be done by a few millimeters than the two glass panes (1, 2) such that the intermediate layer (5) is set back relative to the edge to be sealed (a) of the pre-laminate by the border distance A. The border distance A is preferably 1 to 6 mm. Since the composite glass pane (100) depicted is a lowerable side window, wherein the lower border region, even in the closed state of the window, is hidden in the door well, the lower edge (b) of the composite glass pane (100) need not be sealed such that, here, the intermediate layer (5) can reach all the way to the edge of the composite glass pane (100). A border seal (8) is applied only along the edge (a) to be sealed.

FIGS. 4a and 4b depict a schematic representation of an apparatus for performing the method according to the invention. The representation is not true to scale. The pre-laminate (7) comprising the first glass pane (1), the second glass pane (2), and the intermediate layer (5) rests with a pane surface (20) on a third roller (11), which is displaceable perpendicular to the plane of the glass panes (1,2) in the illustrated direction z. The third roller (11) is fastened, for example, spring mounted, on a fastening arm (13), wherein the fastening arm (13) can be spring mounted instead of the roller (11).

The pane edge (17) of the first glass pane (1) rests against the first roller (9), and the pane edge (18) of the second glass pane (2) rests against the second roller (10). The two rollers (9, 10) are spring mounted and displaceable parallel to the plane of the glass panes (1, 2) in the illustrated direction x. The extrusion die (12) is positioned with the help of the rollers directly in front of the border gap (6) such that the extrusion die opening (14) points toward the border gap (6).

FIG. 5 depicts a flowchart of a possible embodiment of the method according to the invention. First, a first glass pane (1) and a second glass pane (2) are prepared and washed. The two glass panes (1, 2) already have, before their assembly, their final shape and size, as is necessary and generally customary in the production of laminated glass. In the production of bent laminated glass, the two glass panes (1, 2) are bent and, optionally, more or less prestressed to give them greater mechanical strength and/or safety glass properties. Subsequently, an intermediate layer (5) including a cover layer (3,4) is cut to size such that the shape of the intermediate layer (5) corresponds to the shape of the glass panes (1,2), but is, however, smaller on the border, in each case, by roughly 3 mm. The cut-to-size intermediate layer (5) is placed between the first glass pane (1) and the second glass pane (2), with a roughly 3 mm deep border gap (6) created. Then, a so-called "pre-laminate" (7) is produced from this layer package, as is known and customary in the production of laminated glass. The method for producing the pre-laminate (7) can, for example, consist in that the layer package is heated to a temperature of roughly 80 to 90° C. and rolled together with a pair of rollers, wherein the air between the layers is pressed out and a preliminary adhesive bonding of the layers is achieved. Instead of this, the method for producing the pre-laminate (7) can also consist in a vacuum method, in which the air between the layers is suctioned out, and, likewise under heating of the layer package to a temperature of roughly 70 to 100° C., a preliminary adhesive bonding of the layers is achieved. The pre-laminate (7) produced has a border gap (6) open on the circumferential side, with the glass panes (1,2) arranged with an offset B. The pre-laminate (7) is fixed with the help of a vacuum suction gripper and moved into its starting position, in which the border gap (6) points toward the extrusion die opening (14). In this starting position, the pre-laminate (7) is in contact in the border region with three rollers (9,10,11), of which two rollers (9,10) each rest against the pane edges of the individual glass panes (1,2) and a third roller (11) rests against the pane surface of the pre-laminate (7) or the pre-laminate (7) rests on the third roller (11). The third roller (11) can compensate for thickness variations C of the pre-laminate (7), whereas the first roller (9) and the second roller (10) compensate for the offset (B) of the glass panes. When the suction gripper moves the pre-laminate (7) into the starting position, the three rollers are in each case deflected by a certain value. This is necessary so that deviations can be compensated in two directions, i.e., for example, with the third roller (11) thickness variations C can be compensated at thinner points and thicker points of the pre-laminate (7). The third roller (11) can compensate not only thickness variations C of the pre-laminate (7), but can also compensate other deformations of the glass panes (1,2) in the border region, that result in differences in the illustrated direction z. If the glass panes (1, 2) are bent, the pre-laminate (7) can be aligned with the help of the vacuum suction gripper such that the border gap (6) points toward the extrusion die opening (14). The suction gripper itself can "straighten" the pre-laminate (7) for the duration of the injection or the suction gripper can tip the pre-laminate (7) such that the border gap (6) again points toward the extrusion die opening (14). The border gap (6) is injected with a thermoplastic polymer, such as, for example, with melted polyvinyl butyral, with which an adhesion promoter can possibly be mixed. It can be advisable to heat the pre-laminate (7) during the injection of the border gap (6) to an elevated temperature of, for example, 40° C. to 80° C. For this purpose, the pre-laminate (7) can be preheated either immediately before the injection of the border gap, or the injection of the border gap can be done immediately after the pre-lamination process, so long as the pre-laminate (7) still has an elevated temperature from this process. The injection of the border gap (6) can also be undertaken at room temperature.

After the border gap (6) is filled in this manner with, for example, polyvinyl butyral, the pre-laminate (7) is subjected to the customary autoclave process at a temperature of roughly 140° C. and a pressure of roughly 10 bar. In this autoclave treatment, the polyvinyl butyral injected into the border gap (6) and the polyvinyl butyral of the cover layer (3,4) of the intermediate layer (5) fuse with one another to form a completely homogeneous defect-free layer. The boundary line of the coated carrier film (16) is, to be sure, still visible as such on close inspection under certain lighting conditions, but this boundary line is so inconspicuous that the visual aspect as a whole is not negatively affected thereby.

Then, the edges (a,b) of the composite glass pane (100) are processed in order to remove any protruding border seal (8). This can be done by grinding the edges.

LIST OF REFERENCE CHARACTERS 1 first glass pane
2 second glass pane
3, 4 cover layer
5 intermediate layer
6 border gap
7 pre-laminate
8 border seal
9 first roller
10 second roller
11 third roller
12 extrusion die
13 fastening arm
14 opening of the extrusion die
15 corrosion-sensitive functional layer
16 carrier film
17, 18 pane edge
19, 20 pane surface
100 composite glass pane
A border distance
B offset
C thickness variation
a, b edge of the pre-laminate or edge of the composite pane x directions of movement of the first and second roller
z directions of movement of the third roller

The invention claimed is:

1. A method for producing a composite glass pane, the method comprising:
 a) producing a pre-laminate composed of first and second glass panes, each of the first and second glass panes having two opposite main surfaces that are connected by a pane edge;
 b) producing an intermediate layer comprising a cover layer made of a polymer;
 c) assembling the first and second glass panes and the intermediate layer, wherein, after the assembling, (i) the intermediate layer is arranged between the first and second glass panes, (ii) the pane edge of the first glass pane is offset relative to the pane edge of the second glass pane, and (iii) an edge of the intermediate layer is offset relative to both the pane edge of the first glass pane and the pane edge of the second glass pane such that a border gap is formed between the first and second glass panes and along the edge of the intermediate layer;
 d) injecting a melt of a thermoplastic polymer that is fusible with the cover layer into the border gap with an extrusion die to form a border seal in said border gap, wherein an opening of the extrusion die is positioned between a first roller and a second roller directly in front of the border gap so that:
  the first roller rests against the pane edge of the first glass pane and
  the second roller rests against the pane edge of the second glass pane, wherein the first roller and the second roller are displaceable parallel to, respectively, the two opposite main surfaces of the first glass pane and the two opposite main surfaces of the second glass pane to compensate for the offset of the pane edge of the first glass pane relative to the pane edge of the second glass pane, and
  the pre-laminate rests with one of the two opposite main surfaces of the first or second glass pane on a third roller, the third roller being displaceable in a direction perpendicular to said one of the two opposite main surfaces of the first glass pane or the second glass pane,
 e) based on the injecting, forming the border seal;
 f) bonding the first glass pane, the second glass pane and the intermediate layer by supplying of heat and application of pressure; and
 g) based on the bonding, forming the composite glass pane, and fusing the thermoplastic polymer injected into the border gap with the polymer of the cover layer.

2. The method according to claim 1, further comprising: removing a portion of the border seal protruding on the edges of the composite glass pane obtained in step f).

3. The method according to claim 1, wherein the opening of the extrusion die is substantially rectangular or oval.

4. The method according to claim 3, wherein the opening of the extrusion die has a width of 1.5 mm to 3 mm and a height of 0.5 mm to 0.7 mm.

5. The method according to claim 1, wherein in step d), the pre-laminate is guided past the extrusion die.

6. The method according to claim 1, wherein in step d), the extrusion die is guided past the border gap by a remote-controlled robot.

7. The method according to claim 1, wherein in step d), the pre-laminate is heated to 35° C. to 100° C.

8. The method according to claim 1, wherein in step d), the pre-laminate is heated to 40° C. to 80° C.

9. The method according to claim 1, wherein the intermediate layer further comprises a carrier film and a corrosion-sensitive functional layer.

10. A method, comprising:
 using the composite glass pane produced according to the method according to claim 1 as a freestanding pane, or as a freestanding motor vehicle side window pane.

* * * * *